(12) United States Patent
Vasseur et al.

(10) Patent No.: US 8,194,546 B2
(45) Date of Patent: Jun. 5, 2012

(54) TRAFFIC FLOW DETERMINATION IN COMMUNICATIONS NETWORKS

(75) Inventors: Jean-Philippe Vasseur, Dunstable, MA (US); Eric Osborne, Boxborough, MA (US); Josh Singer, Cambridge, MA (US); Stefano Novello, Concord, MA (US); Helmut Matthias Simonis, Richmond (GB)

(73) Assignee: Cisco Technology, Inc., San Jose, CA (US)

( * ) Notice: Subject to any disclaimer, the term of this patent is extended or adjusted under 35 U.S.C. 154(b) by 1257 days.

(21) Appl. No.: 10/554,047

(22) PCT Filed: Feb. 14, 2005

(86) PCT No.: PCT/EP2005/001479
§ 371 (c)(1),
(2), (4) Date: Oct. 21, 2005

(87) PCT Pub. No.: WO2005/079017
PCT Pub. Date: Aug. 25, 2005

(65) Prior Publication Data
US 2006/0250964 A1   Nov. 9, 2006

(30) Foreign Application Priority Data
Feb. 12, 2004  (GB) .................................. 0403159.7

(51) Int. Cl.
*G01R 31/08* (2006.01)
*H04L 12/28* (2006.01)

(52) U.S. Cl. ...... 370/235; 370/238; 370/255; 370/395.5

(58) Field of Classification Search ........................ None
See application file for complete search history.

(56) References Cited

U.S. PATENT DOCUMENTS

| | | | |
|---|---|---|---|
| 5,519,836 A * | 5/1996 | Gawlick et al. ............... | 709/241 |
| 6,650,620 B1 * | 11/2003 | Neogi ........................... | 370/231 |
| 6,665,273 B1 * | 12/2003 | Goguen et al. ................ | 370/252 |
| 6,904,017 B1 * | 6/2005 | Meempat et al. ............. | 370/238 |
| 7,130,262 B1 * | 10/2006 | Cortez et al. .................. | 370/216 |
| 7,233,574 B2 * | 6/2007 | Worfolk et al. ............... | 370/238 |
| 2001/0012298 A1 * | 8/2001 | Harshavardhana et al. .. | 370/405 |
| 2003/0043820 A1 * | 3/2003 | Goringe et al. ............... | 370/400 |

(Continued)

FOREIGN PATENT DOCUMENTS

EP            1246415            10/2002

(Continued)

OTHER PUBLICATIONS

Eueung Mulyana et al., "An Offline Hybrid IGP/MPLS Traffic Engineering Approach Under LSP Constraints", Dept. of Communication Networks, Technical University Hamburg-Harburg, 2003.

(Continued)

*Primary Examiner* — Kwang B Yao
*Assistant Examiner* — Jutai Kao
(74) *Attorney, Agent, or Firm* — Cindy Kaplan (57) ABSTRACT

A method of determining traffic paths between one or more source-destination node pairs in a communications network, comprising starting from a first set of paths between said source-destination node pairs, determining a second set of paths between said source-destination node pairs while taking into account a set of constraints, such that said second set of paths emulates said first set of paths.

36 Claims, 5 Drawing Sheets

U.S. PATENT DOCUMENTS

| | | | |
|---|---|---|---|
| 2004/0006640 A1* | 1/2004 | Inderieden et al. | 709/242 |
| 2004/0052207 A1* | 3/2004 | Charny et al. | 370/216 |
| 2004/0202111 A1* | 10/2004 | Beshai et al. | 370/237 |
| 2004/0249971 A1* | 12/2004 | Klinker | 709/239 |
| 2005/0018693 A1* | 1/2005 | Dull | 370/396 |
| 2005/0128940 A1* | 6/2005 | Wen et al. | 370/216 |
| 2006/0039364 A1* | 2/2006 | Wright | 370/352 |
| 2007/0053300 A1* | 3/2007 | Zhu et al. | 370/238 |
| 2007/0124488 A1* | 5/2007 | Baum et al. | 709/230 |
| 2007/0286201 A1* | 12/2007 | Prager et al. | 370/395.1 |

FOREIGN PATENT DOCUMENTS

| | | |
|---|---|---|
| EP | 2386033 | 9/2003 |

OTHER PUBLICATIONS

Anton Riedl, "Optimized Routing Adaptation in IP Networks Utilizing OSPF and MPLS", Munich University of Technology, Institute of Communication Networks, IEEE ICC 2003.

Francois Le Faucheur et al., "Use of Interior Gateway Protocol (IGP) Metric As a Second MPLS Traffic Engineering Metric", IETF Internet Draft, Sep. 2002.

Bernard Fortz et al., "Internet Traffic Enginerring by Ptimizing OSPF Weights", IEEE Infocom 2000.

* cited by examiner

TRAFFIC FLOW DETERMINATION IN COMMUNICATIONS NETWORKS

This application claims benefit of co-pending PCT application PCT/EP2005/001479 filed Feb. 14, 2005, which was published on Aug. 25, 2005, which claims the benefit of GB application No. 0403159.7 filed Feb. 12, 2004. These applications are incorporated by reference in their entireties.

This invention relates to the field of communications networks. More particularly, but not exclusively, it relates to a method of calculating traffic paths in a communications network.

BACKGROUND OF THE INVENTION

There are different routing protocols used by network operators to route traffic data in a communications network. Many network operators use, for example, the interior gateway protocol (IGP) network routing protocols.

IGPs are a family of related protocols which have been in existence for some time, and are widely deployed.

The family of IGPs includes different protocols, such as the Open Shortest Path First (OSPF) and Intermediate System to Intermediate System (IS-IS).

In some IGPs the default routing strategy is shortest path first (SPF) routing. Some IGPs allow link metrics to be assigned by the operator to each link in the network. In these cases, a path is the shortest path in the sense that the sum of link metrics along the path is minimal amongst all possible paths. In other IGPs, the shortest path is simply the path with the lowest hop count (i.e. the path with the shortest number of links). In all cases, IGPs use distributed protocols so that, once the protocols are in a converged state, all nodes in the network have the same view of the shortest path between a given source and destination node pair.

An alternative to IGPs is explicit-path protocols. Recently, the multi-protocol label-switching traffic engineering MPLS-TE protocol has been developed as an alternative routing protocol. This is an example of an explicit-path protocol. However, the MPLS-TE is (as yet) much less widely used than the IGPs.

The method of routing traffic using explicit-path protocols is considerably different from IGPs. The network operator may specify explicit paths on the network. These paths carry the data traffic all the way from its source node to its destination node. In MPLS-TE, explicit paths may be established by first informing the source node which destination node is required, and of certain other required parameter settings relating to the request. Then, sufficient details are communicated to all the nodes along the explicit path, so that these nodes can recognise packets on the paths and so that they know where to forward such packets.

When a data packet enters the network at the source node, the node selects for the packet one of the paths which starts at the source node and finishes at the destination node. The packet is then routed along the first link in this path. When the packet arrives at a subsequent, intermediate path node before the destination, this intermediate node determines which path the packet is in. At such a node, the packet is then forwarded along the next explicitly defined link in its path.

In a first scenario where a network operator wishes to migrate from one routing protocol to another, the network operator may want to migrate incrementally. For example, in migrating from an IGP routing protocol such as OSPF to the MPLS-TE protocol, a step-by-step approach is usually desired by network operators. This is due to the concern that an immediate switch to the new protocol may cause unpredicted disruption to the traffic on their network, and other unpredicted operational problems.

In addition to the migration scenario, a second scenario that causes difficulties for the network operators is when they wish to apply a routing protocol for the purposes of data collection, as some routing protocols have superior data collection characteristics to others.

As an example, network operators may wish to deploy MPLS TE for the purposes of gathering traffic matrix information about the size of the traffic between source-destination node pairs, while adhering to the IGP routing currently implemented on their network. This traffic matrix information may be used to improve the IGP routing metrics, or may be used as input to other network configuration or capacity planning decisions, or to assist in implementing an incremental migration strategy.

To clarify this point further, IGP metrics, or alternatively MPLS-TE paths, need to be calculated so as to avoid congestion. However this calculation depends on accurate end-to-end traffic matrix estimates. These estimates depend in turn on measurements that indicate how much traffic is passing between each pair of source and destination nodes. In this way the network operator can establish the effects of changing IGP link metrics, or of MPLS-TE paths for certain source-destination node pairs on various routes, and can thus evaluate whether the network is susceptible to congestion. Installing IGP metrics or MPLS-TE paths without knowledge of the traffic matrix carries a high risk that congestion occurs in the network. If the network operator does not know the amount of traffic between the source and the destination nodes, he or she cannot predict congestion.

Once MPLS-TE paths are in place, it is usually possible to query each path to give an accurate measurement of the traffic flow over that path. However, nodes running IGP protocols do not provide this end-to-end traffic matrix information. In order to collect an accurate end-to-end traffic matrix from an IGP network in the absence of MPLS TE, resource-consuming methods need to be employed, such as the installation of costly hardware probes in the network or the installation of possibly disruptive analysis software.

Returning to the first migration scenario, in migrating IGPs to MPLS-TE protocols, the network operator experiences a major difficulty unless a data collection process is implemented. This is because MPLS-TE paths that differ from the current routing cannot be calculated and safely installed without a traffic matrix, and the traffic matrix cannot be cheaply and accurately measured unless MPLS-TE paths are installed.

A third scenario is when network operators wish deploy an alternative protocol due to its superior characteristics under network failure situations. As an example, network operators implementing IGP routing may wish to deploy MPLS TE because of its bandwidth protection capabilities which have a high restoration speed, and can guarantee to protect quality of service temporarily after network link or node failures. However, they may wish to achieve this without affecting the network operation under normal conditions.

One aim of the present invention is therefore to alleviate the difficulties of a migration between two different routing protocols.

Another aim of the present invention is to determine traffic paths in a communications network that mimic the routing behaviour under an existing or previously implemented routing protocol, whilst taking into account constraints imposed by another routing protocol.

Another aim of the present invention is to facilitate the extraction of traffic flow data from a communications network Another aim of the present invention is to facilitate the provision of back-up facilities for operating a communications network According to one aspect of the present invention, there is provided a method of determining traffic paths between one or more source-destination node pairs in a communications network, comprising starting from a first set of paths between said source-destination node pairs, determining a second set of paths between said source-destination node pairs while taking into account a set of constraints, such that said second set of paths emulates said first set of paths.

According to another aspect of the present invention, there is provided a method of calculating traffic paths between one or more source-destination node pairs in a communications network, comprising starting from a first set of paths between said source-destination node pairs, determining a second set of paths between said source-destination node pairs while taking into account a set of constraints, such that said second set of paths is similar to the first set of paths; and the traffic load of said second set of paths is similar to the traffic load of said first set of paths.

According to another aspect of the present invention, there is provided a method of calculating traffic paths between one or more source-destination node pairs in a communications network, comprising starting from a first set of paths between said source-destination node pairs determined using a first routing protocol, determining a second set of paths between said source-destination node pairs for use with a second routing protocol, such that the load balancing in said first and second routing protocols is similar.

Further aspects and advantages of the invention will be appreciated, by example only, from the following description and accompanying drawings, wherein.

Figure 1:
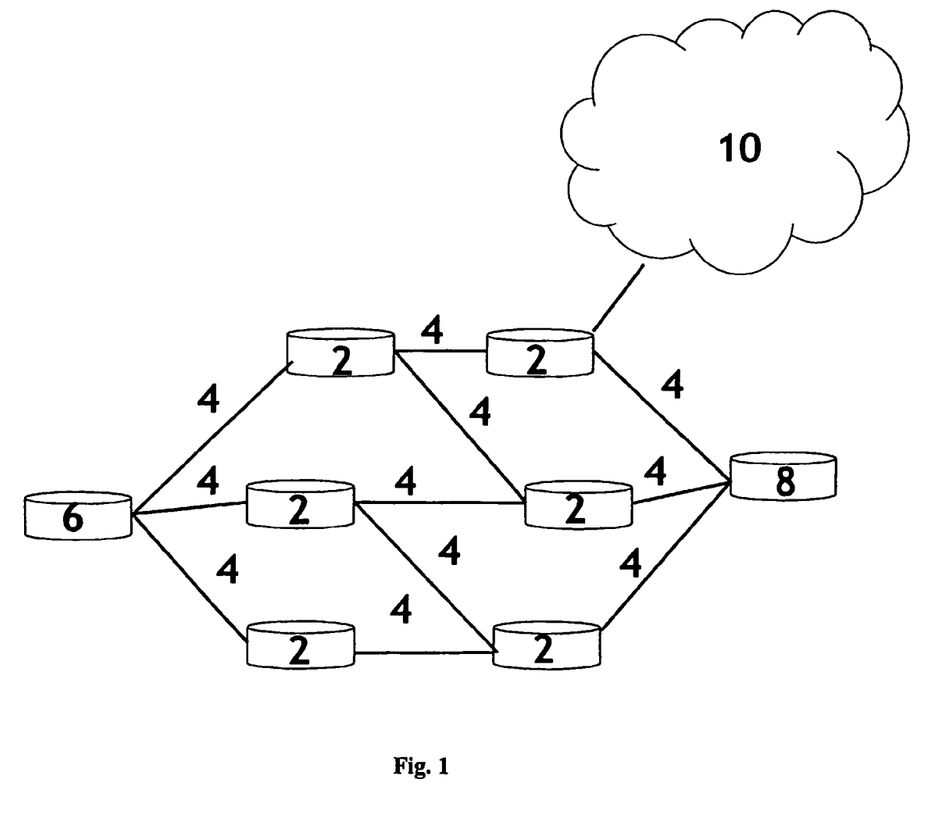
FIG. 1 illustrates a simplified example of a communications network in which the present invention can be implemented.

FIG. 1 illustrates a simplified example of a communications network. Generally, such a network consists of nodes 2 and links 4. Links 4 carry data traffic between nodes 2. Here, link refers to the capability, as provided by various combination of equipment, to send traffic in one direction between two nodes. Traffic, usually in the form of data packets, enters the network at a source 6 node, is carried over the network via various links and nodes, and finally leaves the network at a destination node 8.

Network links have a numeric capacity indicating the magnitude of traffic they can carry. By altering their configuration, the nodes and links can be made to route traffic in different ways, i.e. to route traffic along different alternative path combinations. Network Quality of Service (QoS) is an important consideration when choosing the routing. If at any stage a link has more traffic on it than its capacity, it is said to be congested. Congested links lead to degraded quality of service. Therefore, network operators strive to configure the routing of their traffic carefully and try to avoid congestion. Other considerations regarding QoS are taken into account. They include path delay, that is, the length of time it takes for the traffic to travel from the source node to the destination node, and other QoS requirements such as jitter. In the following, congestion has been used to illustrate QoS requirements, without loss of generality, and as an example only of the various QoS requirements.

Network routing is done via a routing protocol as described above. The communications network 1 may be connected to other networks 10.

Figure 2:
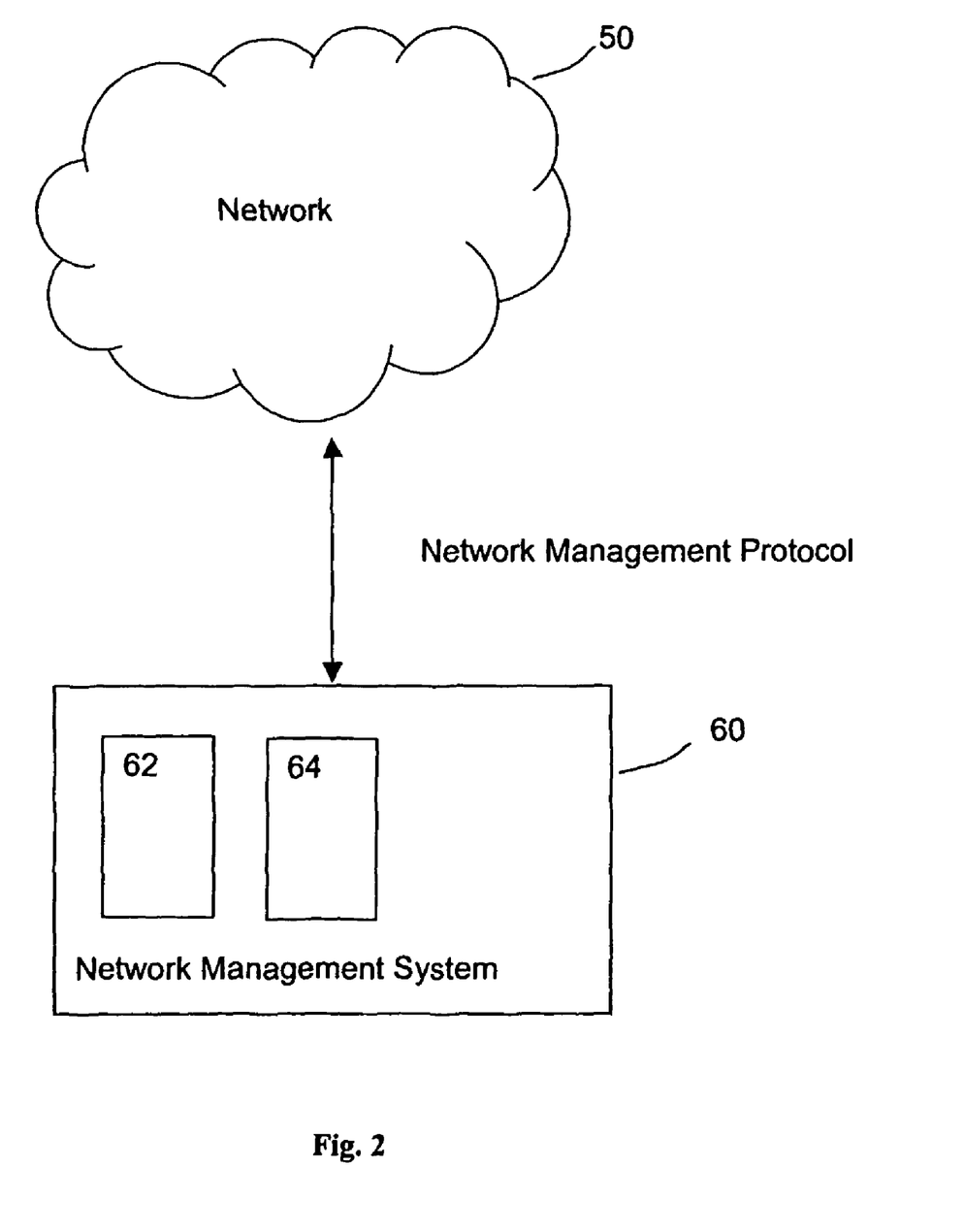
FIG. 2 illustrates the relationship of a network and a network management system, into which the present invention may be implemented.

FIG. 2 illustrates the relationship of the network and a network management system 60 in which the present invention may be implemented. Network management system 60 performs the network management functions for network 50. The network management system communicates with the network using a network management protocol, such as the Simple Network Management Protocol (SNMP). The network management system 60 includes a processor 62 and a memory 64 and may comprise a commercially available server computer. A computer program performing the calculation of data traffic is stored is memory 64 and can be executed by processor 62.

First Embodiment

In the following, one embodiment of the present invention will be described. In this embodiment a network is operated using the IGP, and traffic paths are determined which facilitate migration to the MPLS-TE protocol, such that the implications on the over-all performance of the network are low. Generally, IGP protocols may handle situations differently if there are multiple equally short paths between a given source and destination node pair. Some IGP protocols implement a so-called equal cost multiple paths (ECMP) extension. This is an example of a load balancing strategy. With these protocols, when there are multiple shortest paths, all with the same metric sum, the nodes split the traffic (either actually or probabilistically) over the various outgoing links which are on these multiple paths.

Also, there exist various additional mechanisms to extend the basic shortest path routing approach of IGPs, such as multiple routing areas (e.g. OSPF Areas, IS-IS levels), inbound route filtering or static routes. However, in all cases, given sufficient configuration information, for a given source destination pair, it is possible to determine which paths through the network the traffic will use, and which fraction of the end-to-end traffic will pass over each link.

Also for the MPLS-TE protocol, different implementations are possible. Load sharing, for example, may be handled in different ways. If several paths are available that transmit data to a certain destination, the situation may be handled differently according to the network hardware and software involved in implementing the paths. For example, the implementation of load sharing may depend on the hardware at the source node and/or the operating software which is present at the source node.

One example to illustrate is given in the following. Nodes manufactured by vendor A running a certain version of operating software may, for example, allow equal splitting of traffic over several paths, and allow for a maximum of 16 paths only between a given source and destination pair. However, the network may use less than the maximum number of paths.

Alternatively, nodes manufactured by vendor B running different operating software may, for example, allow that each path is assigned a so-called "load share" parameter which determines the fraction of the traffic which will use the path. Also, the protocol may for example be implemented such that splitting of traffic according to the load share parameter may be unequal as long as all traffic is allocated to some path, and each path is allocated a fraction of traffic which is a multiple of 1/16, and a maximum of 8 tunnels only may be used between a given source destination pair. Again, less than the maximum number of paths may be used.

In summary, in MPLS-TE hardware and software limitations exist, which restrict which MPLS-TE path combinations are possible between a source and destination node pair.

Figure 3:
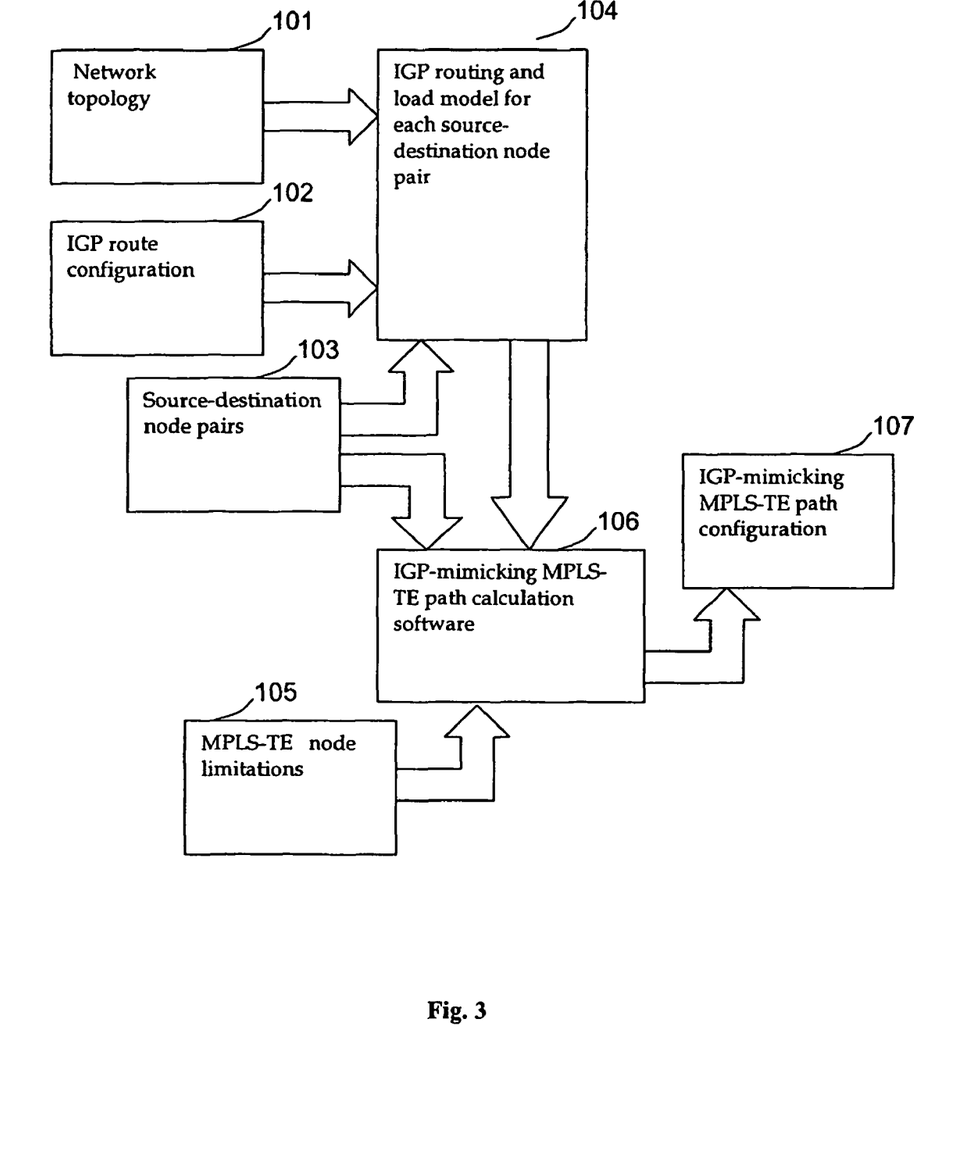
FIG. 3 is a diagram illustrating the method of determining traffic paths according to one embodiment of the present invention.

It is now referred to FIG. 3. In order to determine traffic paths which can be used in the MPLS-TE routing protocol, network topology data (step 101) and IGP route configuration data (step 102) are collected. In step 103 a set of source-destination node pairs are selected, for which traffic paths will be determined. This set of source-destination node pairs might be a subset of all such pairs in the communications network.

The data obtained in steps 101, 102 and 103 can now be used to build a data model of the IGP routing for each of the selected source-destination node pairs (step 104). For each pair, the IGP routing model determines the set of paths used to transmit data from the source node to the destination node in the IGP routing and the fraction of traffic between the pair on each path. In step 105, MPLS-TE hardware and software limitations are specified, as these limitations constrain the determination of the traffic paths to be determined.

Using the IGP model for each source destination pair and taking into account the MPLS-TE hardware and software limitations, in steps 106 and 107 a set of MPLS-TE paths are determined for a particular source-destination pair. The paths are determined such that they are as closely as possible to the IGP paths for the particular node pair, while taking into account the constraints resulting from the MPLS-TE protocols and MPLS implementation.

Figure 4A:
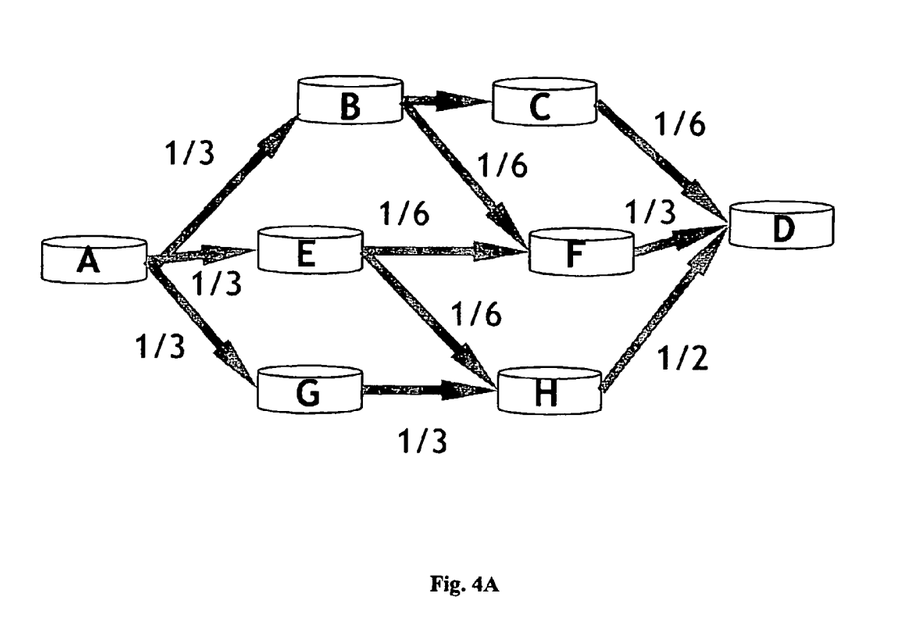
FIGS. 4A and 4B are diagrams illustrating individual steps of performing the method of FIG. 3.
Figure 4B:
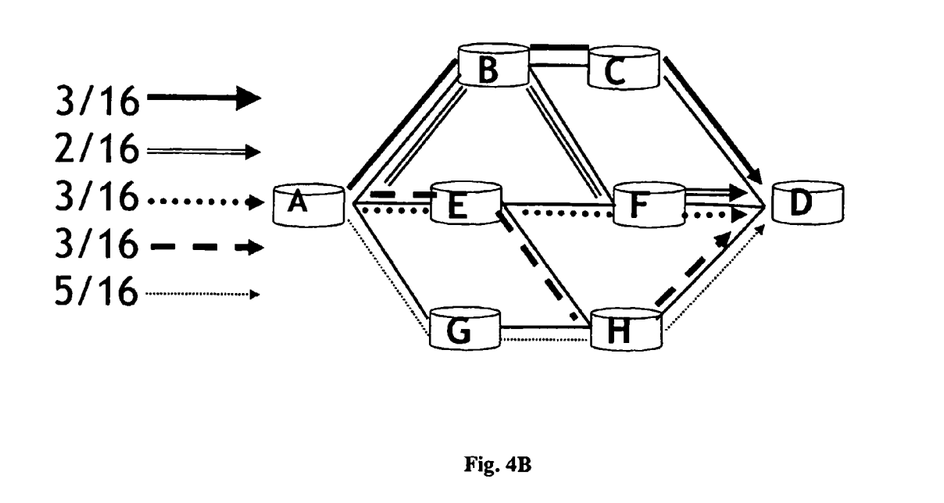

Referring now to FIG. 4, a simplified example will be presented to illustrate the embodiment described above.

FIG. 4 illustrates a simplified network consisting of nodes A to H, wherein each link has the same link metric. Consider now a traffic flow between source node A and destination node D. It can be seen from FIG. 4 that there are several shortest paths between nodes A and D, i.e. the five different paths A→B→C→D, A→B→F→D, A→E→F→D, A→E→H→D and A→G→H→D. If now ECMP load balancing is used, node A splits the traffic destined for node D equally over links A→B, A→E and A→G. So ⅓ of the traffic from node A to node D passes over each of these links. Similarly, the flow is further split at later nodes, and at other nodes, such as node F, the traffic flow merges again before finally completely merging back again at the destination node D.

Listed below is the amount of traffic between all links of the communications network as determined from the IGP using ECMP load sharing:

| A→B: | ⅓ |
| A→E: | ⅓ |
| A→G: | ⅓ |
| B→C: | ⅙ |
| B→F: | ⅙ |
| E→F: | ⅙ |
| E→H: | ⅙ |
| G→H: | ⅓ |
| C→D: | ⅙ |

-continued

| F→D: | ⅓ |
| H→D: | ½ |

Consider now that the MPLS-TE limitations demand that each path from node A to node D carries a fraction of traffic which is a multiple of 1/16.

If now the source-destination node pair A-D is selected, the IGP model depicted in FIG. 4 A is used and the above described MPLS-TE limitation is taken into account, the traffic paths between nodes A and D are determined which "mimic" as closely as possible the IGP paths and the relative fraction of these paths as shown in FIG. 4A.

The solution to this problem includes the same set of five paths A→B→C→D, A→B→F→D, A→E→F→D, A→E→H→D, A→G→H→D, with the following traffic fractions:

| A→B→C→D: | 3/16 |
| A→B→F→D: | 2/16 |
| A→E→F→D: | 3/16 |
| A→E→H→D: | 3/16 |
| A→G→H→D: | 5/16 |

This solution is illustrated in FIG. 4 B.

Note that the total fraction of traffic placed on each link is as similar as possible to that of the IGP model as described above. For example on link H→D, ½ the traffic flows over this link in both cases. On link F→D, on the other hand, it is not possible to match the IGP fraction exactly. The traffic paths resulting in a traffic flow which is closest to the IGP model results in a traffic flow of 5/16 of the total traffic on this link. This is close to the ⅓ of the traffic which is transmitted on this link in the IGP model.

Generally, for the embodiment described above with reference to FIG. 3, the following quantities are used as an input to calculate paths taking into account MPLS-TE constraints which are "mimicking" or "emulating" the paths resulting from the use of IGP.

Input:
    For each node in the network, the MPLS-TE path constraints for that node
    A set of source-destination pairs
    For each source-destination pair
        The set of all paths which is being used by the IGP protocol to route the traffic between the pair
        For each link in the network, the fraction of the traffic between the pair which is being routed over that link Output:
    For each source-destination pair
        The MPLS-TE paths set, a subset of the IGP paths
        For each MPLS-TE path, a fraction of traffic which should go over that path
    such that
        The MPLS-TE path constraints implied by the network hardware and software limitations are satisfied by the path set choice and path traffic fraction choices.
        The MPLS-TE routing is as close to the IGP routing as possible in the sense that using the former routing leads to a fraction of end-to-end traffic on each link which is as close as possible to the fraction on the link when using the latter routing.

Considerations for Problem Decomposition

Generally, the above described problem can mostly be solved separately for each source destination pair. However, this separate treatment of the problem may introduce a systematic bias towards particular links or paths.

It is noted that in the example described above with reference to FIGS. 4 A and B, the link A→E receives 6/16 of the traffic in the "MPLS-TE case" (i.e. the determination as shown in FIG. 4B), whereas the link receives 1/3 of the traffic in the IGP model. Thus, the same link carries slightly more traffic in the MPLS-TE case than in the IGP model. On the other hand, link A→B carries slightly less traffic in the MPLS-TE case compared to the IGP model (5/16 versus 1/3, respectively). Such discrepancies are unavoidable given the MPLS-TE limitations on tunnels between nodes A and D. However, if this bias in favour of placing traffic on link A→E instead of A→B were systematic across the MPLS-TE tunnels produced for many demands, the errors could multiply and so the routing could be much less similar to the IGP routing.

Such a systematic bias is prevented by randomly choosing between solutions which are equally close to the IGP routing, of which there are often several. In this way the discrepancies due to the MPLS-TE limitations at least partly cancel out when considering several source destination pairs.

Mathematical Formulation

In the following, a mathematical formulation is given for the embodiment described above.

In view of the considerations regarding the problem consideration described above, in the mathematical model formulated below a single source-destination pair (s, t) is considered for which paths mimicking the IGP paths are computed.

The model below describes two particular MPLS-TE limitations: the constraints on the allowable load fractions and a maximum number of tunnels between a particular source-destination node pair. It is appreciated that these constraints serve merely as an example to illustrate the mathematical model, and that alternatively other limitations may be considered.

Constants

L is the set of all links. The letter i will range over links.

P is the set of all paths between s and t which are shortest paths in the IGP routing. The letter p will range over paths.

The 0/1 constants $z_{ip}$ indicate whether link i is one of the links in path p.

The rational constants $l_i$ ($0 \leq l_i \leq 1$) indicate the fraction of the traffic between the between s and t which passes over link i in the IGP routing.

$F_s$ is a constant finite non-empty set of rational constants $\{f_1, f_2, \ldots\}$: the allowed traffic fractions for MPLS-TE paths which start at node s. Zero must be a member of $F_s$. For each f in $F_s$, $0 \leq f \leq 1$.

$M_s$ is a constant positive integer: the maximum number of MPLS-TE paths which can carry traffic from source node s to destination node t.

Variables

The 0/1 variables $x_p$ indicate whether path p is one of the MPLS-TE paths.

The variables $b_p$ range over the set $F_s$: the fraction of the traffic which is assigned to path p in the MPLS-TE routing.

Constraints

For any path p, it is used as an MPLS-TE path if and only if it has a non-zero fraction of traffic.

$$(\forall p \in P) x_p = 1 \leftrightarrow b_p \neq 0 \quad (C1)$$

The maximum paths limit at node s must be respected $$\sum_{p \in P} x_p \leq M_s \quad (C2)$$

The sum of fractions of traffic over all MPLS-TE paths must be 1, i.e. the paths must carry all traffic.

$$\sum_{p \in P} b_p = 1 \quad (C3)$$

Optimisation Function

The optimisation function is given by $$\sum_{i \in L} |b_p z_{ip} - l_i| \quad (Opt)$$

i.e. a minimisation of the sum over all links of absolute differences between the fraction of traffic between s and t on the link in the IGP routing and the fraction on the same link.

It is noted that alternatively other optimisation functions may be used. Generally, the optimisation functions relate the product $b_p z_{ip}$ (the MPLS-TE traffic fraction) to $l_i$ (the IGP traffic fraction).

Search Algorithm

In the following, a so-called "Generate and Test" search algorithm is presented, which outputs an optimal solution to this problem. It is noted that this algorithm avoids systematic link/path bias by breaking ties randomly, as described above.

1. Solutions := ∅
2. BestCost := ∞
3. Generate all member tuples of the cartesian product $F_s^{|P|}$
4. For each member b of $F_s^{|P|}$
   a. For each tuple element $b_p$ of b,
      i. If $b_p$ is greater than 0 set $x_p$ equal to 1
      ii. Else set $x_p$ equal to 0
   b. If constraints (C2) and (C3) hold for b and (Opt) for b ≤ BestCost
      i. If b<BestCost then Solutions := {b} else Solutions := Solutions ∪ {b}
      ii. BestCost := b
5. If Solutions is non-empty, return a random member of Solutions.

It is noted that the above described algorithm relates to a single source destination pair. Usually, more than one source destination pair is considered in a network. In this case a single computer may execute the algorithm for all pairs. Alternatively, the computation can be distributed over a number of computers or nodes. Alternatively to the implementation as described above with reference to FIG. 2, the computation may be performed in one or more of the nodes 2 of the communications network as shown in FIG. 1, or any other computer connected to the network.

The above embodiment may for example be implemented such that each node in the network is responsible for computing a subset of all pairs in a way that all pairs are covered. For example a node might compute all pairs where it is the source. The fifth embodiment, which will be described below, relates to specific aspects of a distributed implementation.

Second Embodiment

The method described above may for example be used to temporarily move a part of the network traffic from an IGP routing protocol to a MPLS-TE routing protocol to collect accurate traffic flow data. As described above, the MPLS-TE protocol provides for accurate measurements of the traffic flows.

Figure 5:
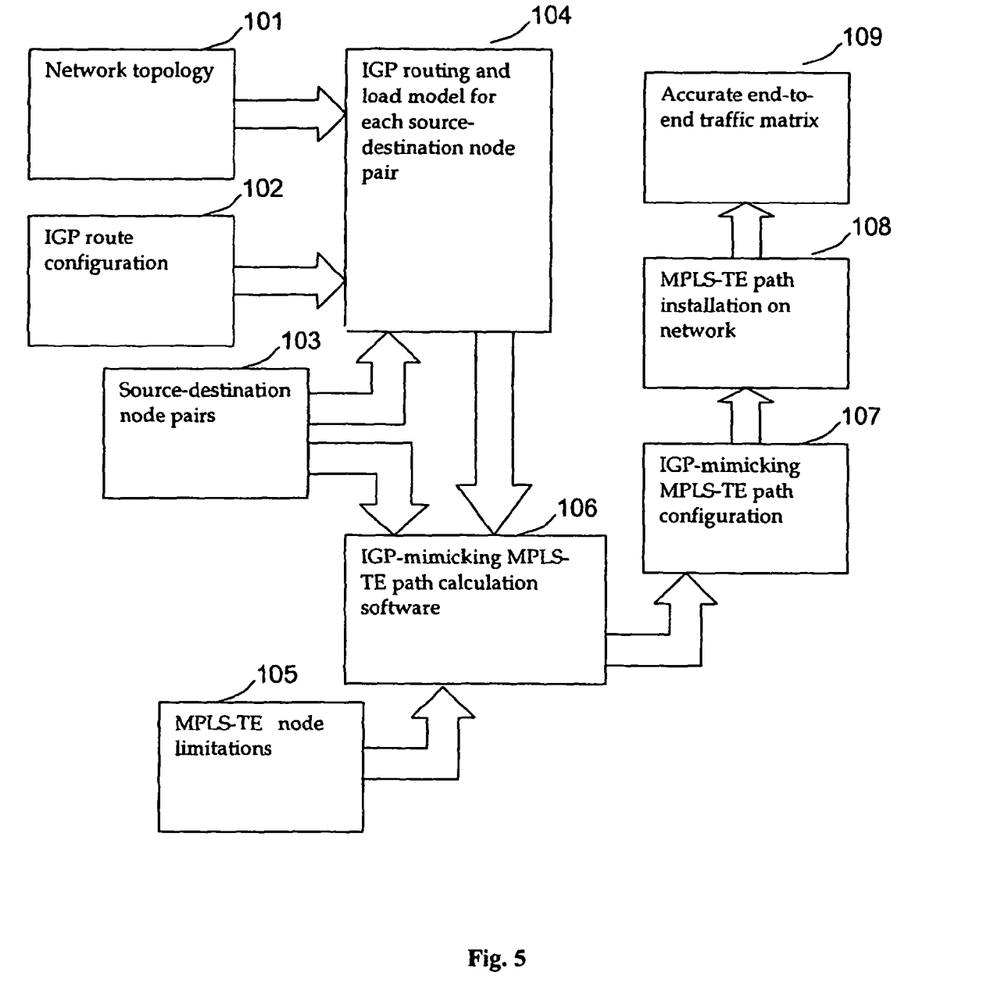
FIG. 5 is a diagram illustrating the method of determining traffic flow measurements according to a further embodiment of the present invention.

This procedure will be explained with reference to FIG. 5. Steps 101 to 107 of FIG. 3 are equivalent to those in FIG. 5, and are therefore denoted with the same reference numerals.

In step 103, the network operator selects certain source-destination node pairs for which he wants to have traffic flow measurements. In steps 106 and 107 the MPLS-TE paths which are closest to the IGP paths used in the original network are calculated from the IGP model, taking into account the MPLS-TE constraints as described earlier with reference to FIG. 3.

In step 108, the calculated MPLS-TE paths are installed on the network and the network is operated by using the MPLS-TE routing protocol for part of the network, i.e. the source-destination node pairs selected in step 103. Thus, the network operator receives accurate end-to-end traffic measurements for the selected part of the network in step 109.

Although the paths for the network operating with IGP routing protocol may be slightly different to the paths used for MPLS-TE routing, the MPLS-TE routing will have very similar properties to the IGP routing, and in particular the resulting link loads will only be slightly affected by the introduction of the MPLS-TE routing.

If the MPLS-TE tunnels are no longer required after the end-to-end traffic data has been collected, they can be removed, and the network is operated by reverting to IGP routing.

Third Embodiment

The method described above may also be used if a network operator wants to decommission permanently the IGP protocol in favour of MPLS-TE technology, for example because the network operator considers the MPLS-TE protocol to offer better manageability and flexibility compared to the IGPs.

In this case the network operator applies the migration process as described above with reference to FIGS. 3 and 5 to all source-destination pairs, and in this way collects traffic data for each source-destination pair for which MPLS-TE is to be used. With these traffic data the network operator can set the resource reservation setup protocol (RSVP) bandwidths of the MPLS-TE paths according to the traffic flow measurement obtained to ensure smooth running of the communications network after migration to the new routing protocol.

In this way the "risk" of migration from a network operating with an IGP to a network operating using the MPLS-TE protocol is reduced as the network operator knows that the traffic in the MPLS network is routed in paths very similar to those previously used. Therefore, if congestion was absent in the IGP routing, it should also be absent in the IGP-mimicking MPLS-TE routing.

Fourth Embodiment

A network operator may want to migrate some of the network traffic from IGP routing to MPLS-TE routing in order to provide back-up facilities such as secondary paths in case of a network failure. Such back-up facilities are for example provided by a MPLS network in form of the so-called FastReRoute (FRR) facility bypass tunnels. These mechanisms provide back-up facilities with fast failover times and can form part of a bandwidth protection mechanism.

In this case the network operator applies the general migration process to all source-destination pairs, and collects traffic data to determine the link load on each link. In the next step the network operator assigns a primary bandwidth to each link.

The primary bandwidth of each link is assigned such that there will be no congestion under failure, as long as the link load is below the assigned amount when the failure occurs. The bandwidth to be assigned is calculated on the basis of the measured link load. The network operator may, for example, select the maximum link load observed over a given time period as the assigned primary bandwidth for each link. The network operator also assigns a secondary or backup bandwidth, which specifies the amount of traffic which can be carried by the link in addition to the primary bandwidth in case of a network failure.

The secondary bandwidth is assigned such that no unacceptable congestion on the link is caused. The network operator may, for example, select a certain percentage of the link capacity minus the primary bandwidth as the secondary bandwidth. Subsequently, the secondary tunnels are calculated to ensure there is no congestion, without having knowledge of the size of end-to-end traffic flows.

It is noted that the secondary tunnels may not use the FRR load balancing features.

Then the secondary tunnels can be installed in the network.

Fifth Embodiment

It may be the nodes in the network that create and maintain the MPLS-TE paths that mimic IGP routing. This proceeds as follows. A node (the "head" node) is instructed to create a set of one or more MPLS-TE paths from itself to a specified destination node. One of the parameters of this request indicates that the routing of the set of MPLS-TE paths should mimic the IGP routing as described above. This parameter setting is an alternative to using a path obtained using the Constrained Shortest Path First (CSPF) approach or using an explicitly configured path. The head node then computes such paths using a method such as that described above. It could perform this computation using its own processor and memory. Alternatively, it could request another connected computer to perform the computation. The paths are the set up on the network, e.g. by signalling to other nodes using RSVP/CR-LDP. In addition the head node configures its own load-balancing parameters in order to match the sharing configuration suggested by the IGP-mimic computation. Subsequently, the head node updates the set of mimicking paths and the load-balancing parameters whenever there are changes in the topology, including the IGP metrics. The set of paths associated with the original request and their load balancing configurations are maintained together as a single unit each time a change happens. After a topology or IGP metric change, the IGP mimic computation may suggest a completely different set of mimicking paths to replace those for the original request. The set of paths may be different, there may be more or fewer paths and the load-balancing configuration of the paths may be different.

Some features have been proposed which automate the creation and maintenance of a full mesh or clique of paths between all nodes in a given set. In a full mesh, there is at least one path in each direction between any two nodes in the set. The advantage of this is to conveniently manage large numbers of paths as new nodes are added and removed. In the context of MPLS-TE, "automesh" is such a feature.

The automesh feature allows the network operator to define "mesh groups". Each mesh group is a set of nodes. The intention is that between any pair of nodes in the mesh group there are always at least two MPLS-TE paths, one in each direction. The set of all paths related to the mesh group are the "mesh group paths".

The automesh feature proceeds as follows. The operator indicates to each node that it belongs to a mesh group. The node then discovers the other members of these mesh groups by means of a distributed protocol. The node then manages the setting up of the mesh group paths which start at itself and lead to other members of the mesh group. If a new node joins the mesh group, the first node will establish a new set of paths leading to the new node. The first node manages the set of paths until it or the new node leaves the mesh group, at which point it manages the deactivation of the set of paths.

Associated with the mesh group are a set of path configuration parameters which should be applied when setting up any mesh group paths.

The current design of MPLS-TE and of automesh only allows one MPLS-TE tunnel and one MPLS-TE path in each direction between any two mesh group member nodes.

For the implementation of IGP mimicking the present embodiment generalises the design of MPLS-TE or the automesh feature, or both, to allow load balancing. This is implemented either by allowing multiple load-balancing MPLS-TE tunnels between each mesh group pair or by allowing multiple load-balancing MPLS-TE paths per tunnel or by some combination.

The present embodiment adds a parameter to the mesh group's path set configuration parameters. This embodiment specifies a new parameter: the indication that the path set will be routed in a manner which mimics IGP routing instead of using CSPF or explicit routing. The parameter could be part of each node's configuration, such that it always uses IGP mimicking when establishing mesh group path sets.

Alternatively, the parameter could be communicated over the protocol which establishes the mesh group; in this case a node joining the group indicates that mesh group paths established with the said node as the destination should use IGP-mimicking.

If the operator changes the configuration setting specifying whether the path set is routed using IGP mimicking, and the setting before the change indicated that the path set should be routed according to IGP mimicking, and the setting after the change indicated another type of routing (e.g. CSPF or explicit) and one of the IGP mimicking paths is consistent with the new setting, then only the inconsistent paths should be deactivated on the network, in order to ensure a smooth transition.

The resulting communications network is routed using MPLS-TE but the routes match IGP routing closely, without the management overhead associated with MPLS-TE.

In order to avoid a systematic bias in the determination of the traffic paths, a documented pseudo-random method may be used to select an "optimal" solution, so that an external tool could simulate the node choices.

There would be time-lag parameter, so that routes would not be adjusted immediately after any topology change. Setting different time-lags on different nodes would ensure a smooth transition from old to new routes whenever the topology changed.

The benefits of a distributed implementation for the network operator are enhanced simplicity and reliability.

Sixth Embodiment

It is very often the case that there are a small number of source-destination pairs contribute the majority of all traffic. The network operator may wish to take advantage of this by only converting those source-destination pairs to MPLS-TE, using routes that emulate IGP routing. Alternatively or in addition, the network operators may convert only those pairs that, according to IGP routing, place traffic on the most congested links.

Having converted the selected (high traffic or congestion) source-destination node pairs, measured the traffic flow as described above and confirmed that the majority of traffic carried by the most congested links is carried within existing MPLS-TE paths, the operator may then convert the source-destination pairs carrying smaller traffic flows for example by selecting an "arbitrary" shortest path, without necessarily trying to emulate IGP load balancing, as the network operator knows that these flows are either small or do not use the most congested links.

One example method of selecting an initial set of "large flows" without the network operator knowing the traffic matrix, is for the operator to use traffic flow analysis and IGP route simulation. Based on link load measurements, the network operator selects traffic flows for which the traffic flow analysis determines that they are not larger than a certain predetermined threshold. Based on IGP route simulation, the network operator selects those pairs amongst them that are routed over the most congested links.

While it is often the case that network operators partition their nodes into those that are sources and destinations and those that are mid points where no traffic originates, the network operator may alternatively choose to have nodes performing both functions. In the case the traffic flow figures obtained for MPLS-TE paths between such a dual-purpose source node and the destination node may include any traffic not already carried by MPLS-TE paths, that was going to the same destination and traversed that node on the way.

In this case an operator wishing to only operate part of their network using MPLS-TE needs to take care to ensure that the only traffic being carried by the MPLS-TE paths originates at those nodes. This can be done in various ways. For example, the operator may force traffic to avoid an existing tunnel by using static routes, or by creating additional MPLS-TE paths which ensure that flows from different sources are carried in disjoint MPLS-TE paths.

Whilst in the above described embodiments an optimal search algorithm has been described, it is appreciated that alternatively so-called heuristic algorithms may be used, which might not return an optimal solution.

Whilst in the above described embodiments the "Generate and Test" approach has been described, it is appreciated that other search algorithms or algorithm engineering techniques can be applied alternatively, as for example constraint programming, mathematical programming, operations research, artificial intelligence.

Whilst in the above described embodiments the migration from a IGP network to an MPLS-TE network has been described, it is appreciated that the method can alternatively used for migrating networks between other routing protocols.

Whilst in the above described embodiments the automesh feature was extended to allow IGP mimicking, it is appreciated that alternatively other features which manage the creation of paths on the communications network can be similarly extended.

It is to be understood that the embodiments described above are preferred embodiments only. Namely, various features may be omitted, modified or substituted by equivalents without departing from the scope of the present invention, which is defined in the accompanying claims.

The invention claimed is:

1. A method of determining traffic paths between one or more source-destination node pairs in a communications network, comprising:
   identifying input data at a network management system, said input data comprising:
   a first set of paths between said source-destination node pairs, said first set of paths used by a first routing protocol to route traffic between said source-destination node pairs;
   a fraction of traffic carried on said first set of paths for each path in said first set of paths; and
   a set of constraints associated with a second routing protocol; and
   using said input data to calculate at the network management system a second set of paths between said source-destination node pairs such that said second set of paths emulate said fraction of traffic carried on said first set of paths, each of said first and second set of paths extending from a network interface at a source node to a destination node;
   wherein the second set of paths is determined for use with the second routing protocol, different from said first routing protocol.

2. A method according to claim 1, wherein the first set of paths are included in a routing and load model for said source-destination node pairs related to said first routing protocol.

3. A method according to claim 2, wherein said routing and load model takes into account the network topology, the route configuration resulting from the use of the first routing protocol, and a selection of source-destination node pairs.

4. A method according to claim 1, wherein the second set of paths is determined such that the routing using said second routing protocol is similar to the routing using said first routing protocol.

5. A method according to claim 1, wherein said set of constraints is related to said second set of paths.

6. A method according to claim 1, wherein said constraints result from network nodes limitations and/or routing protocol constraints related to said second set of paths.

7. A method according to claim 1, wherein said first routing protocol includes an interior gateway protocol.

8. A method according to claim 1, wherein said first routing protocol applies load balancing.

9. A method according to claim 1, wherein said first routing protocol includes an equal cost multiple paths extension.

10. A method according to claim 1, wherein in said second routing protocol data are routed on pre-determined paths.

11. A method according to claim 1, wherein said second routing protocol includes a multi-protocol label-switching traffic engineering protocol.

12. A method according to claim 1, wherein said constraints comprise a maximum number of paths between each source-destination node pair.

13. A method according to claim 1, wherein said constraints comprise that the traffic between a particular source-destinations node pair is load-balanced such that the share of traffic along any paths is a fraction with constrained integer numerator and denominator.

14. A method according to claim 1, wherein a search technique is used to determine said second set of paths.

15. A method according to claim 1, wherein one of the following search techniques are used to determine said second set of paths: "generate and test" search algorithm, constraint programming and/or mathematical programming.

16. A method according to claim 14, wherein an optimal search algorithm is used.

17. A method according to claim 14, wherein a heuristic search algorithm is used.

18. A method according to claim 1, wherein each source-destination node pair is treated independently.

19. A method according to claim 18, comprising a method of avoiding a systematic bias for particular paths.

20. A method according to claim 19, wherein ties between symmetric solutions are broken randomly.

21. A method of providing secondary paths for a communications network, comprising the method of claim 1.

22. A method according to claim 21, wherein a measured maximum link load is used as the primary bandwidth for each link.

23. A method according to claim 21, wherein part of the remaining link capacity is used for the secondary paths.

24. A method according to claim 21, wherein the secondary paths are determined for the non-load balanced case.

25. A method of calculating traffic paths between one or more source-destination node pairs in a communications network, comprising:
   identifying input data at a network management system, said input data comprising:
   a first set of paths between said source-destination node pairs, said set of paths used by a first routing protocol to route traffic between said source-destination node pairs;
   a fraction of traffic carried on said first set of paths for each path in said first set of paths; and
   a set of constraints associated with a second routing protocol;
   using said input data to calculate at the network management system a second set of paths between said source-destination node pairs, such that
   i) said second set of paths is similar to the first set of paths; and
   ii) the traffic load of said second set of paths is similar to the traffic load of said first set of paths;
   wherein the second set of paths is determined for use with said second routing protocol, different from said first routing protocol, said set of constraints associated with said second routing protocol, and each of said first and second paths extending from a network interface at a source node to a destination node.

26. The method of claim 25 wherein the load balancing in said first and second routing protocols is similar.

27. The method of claim 24 wherein said first routing protocol comprises an interior gateway protocol and said second routing protocol comprises a multi-protocol label-switching traffic engineering (MPLS-TE) protocol.

28. A method according to claim 27, wherein at least some of the traffic is protected using secondary tunnels.

29. An apparatus for determining traffic paths between one or more source-destination node pairs in a communications network, comprising:
   a processor for:
   identifying input data at a network management system, said input data comprising:
   a first set of paths between said source-destination node pairs, said set of paths used by a first routing protocol to route traffic between said source-destination node pairs;
   a fraction of traffic carried on said first set of paths for each of said paths in said first set of paths; and
   a set of constraints associated with a second routing protocol; and using said input data to calculate at the network management system a second set of paths between said source-destination node pairs such that said second set of paths emulate said fraction of traffic carried on said first set of paths, each of said first and second paths extending from a network interface at a source node to a destination node; and memory for storing said input data;

wherein the second set of paths is determined for use with the second routing protocol, different from said first routing protocol.

30. The apparatus of claim 29 wherein the first set of paths are included in a routing and load model for said source-destination node pairs related to said first routing protocol.

31. The apparatus of claim 30, wherein said routing and load model takes into account the network topology, the route configuration resulting from the use of the first routing protocol, and a selection of source-destination node pairs.

32. The apparatus of claim 29 wherein the second set of paths is determined such that the routing using said second routing protocol is similar to the routing using said first routing protocol.

33. The apparatus of claim 29, wherein said constraints result from network nodes limitations or routing protocol constraints related to said second set of paths.

34. The apparatus of claim 29, wherein said first routing protocol includes an interior gateway protocol.

35. The apparatus of claim 29, wherein said first routing protocol applies load balancing.

36. The apparatus of claim 29, wherein said first routing protocol includes an equal cost multiple paths extension.

\* \* \* \* \*